United States Patent [19]

Soriano et al.

[11] 3,727,760
[45] Apr. 17, 1973

[54] WATER DECOMPOSITION APPARATUS

[75] Inventors: Charles A. Soriano, Fairfield, Conn.; William E. Hanford, North Tarrytown, N.Y.

[73] Assignee: World Water Resources, Inc., New York, N.Y.

[22] Filed: Feb. 12, 1971

[21] Appl. No.: 114,805

[52] U.S. Cl. ................ 210/101, 210/104, 210/202, 210/205
[51] Int. Cl. ............................................. B01d 35/02
[58] Field of Search ............... 210/101, 103, 104, 210/123, 205, 202; 23/272.7, 272.8

[56] References Cited

UNITED STATES PATENTS 3,366,459  1/1968  Richards ........................ 23/272.7
3,495,948  2/1970  Long et al. ...................... 23/272.7
3,129,172  4/1964  Dicken, Jr. et al. ............... 210/205

Primary Examiner—John Adee
Attorney—Edward H. Gorman, Jr.

[57] ABSTRACT

An apparatus is provided between a contaminated water source and a potable water supply which renders effective chemical purification of the water while providing a means of controlling the water input to the apparatus in accordance with the demand for potable water. The controlling means is operated by a pressure chamber which is in turn regulated by a pressure relief means. A relatively small amount of water is chemically treated and subsequently mixed with a large quantity of untreated water.

9 Claims, 5 Drawing Figures

3,727,760

PATENTED APR 17 1973

INVENTOR
CHARLES A. SORIANO
WILLIAM E. HANFORD, JR.
BY
Frank W. Liffo
ATTORNEY

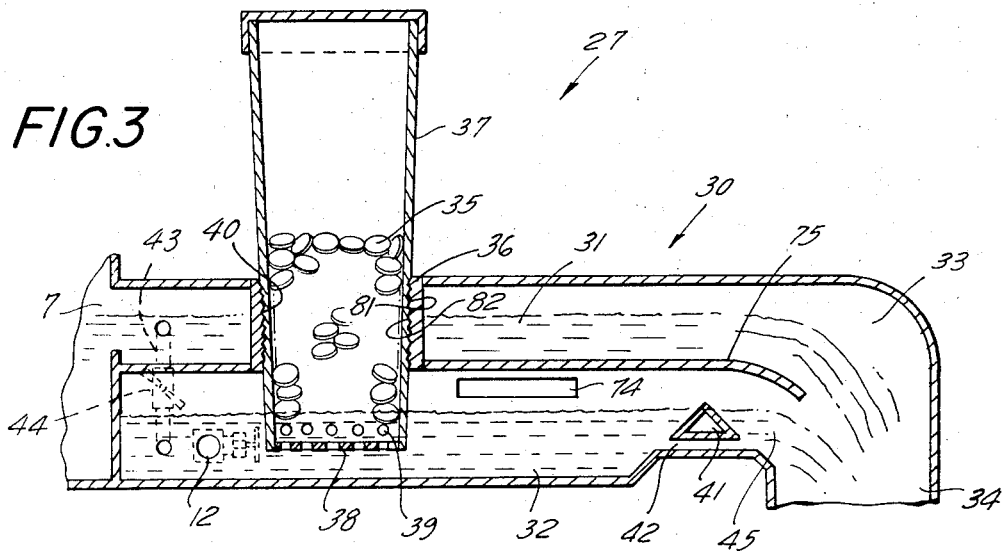
FIG.3
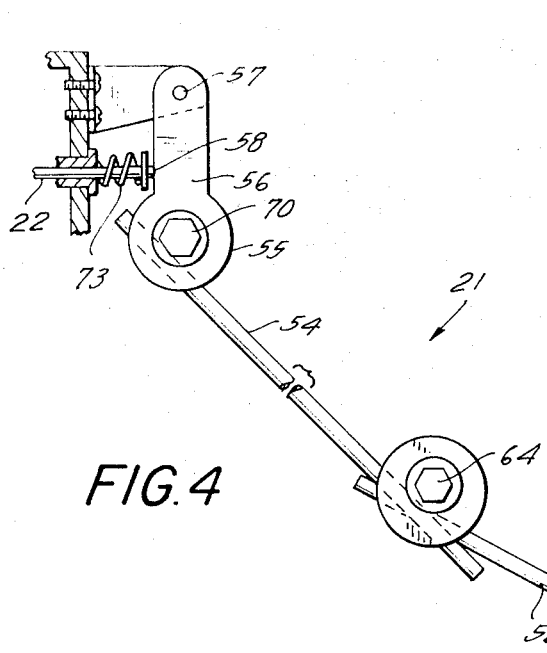
FIG.4
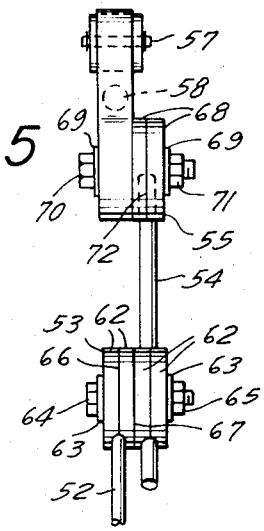
FIG.5
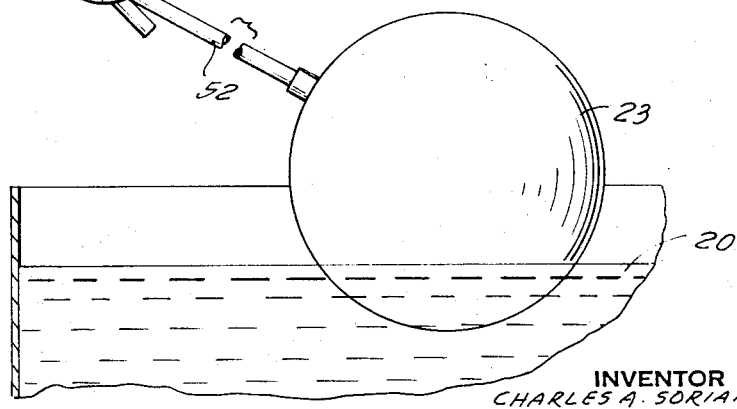
INVENTOR
CHARLES A. SORIANO
WILLIAM E. HANFORD, JR.
BY Frank W. Luffo
ATTORNEY

WATER DECOMPOSITION APPARATUS

This invention relates to a water treatment apparatus and more particularly to an apparatus for chemically treating contaminated water to render it potable.

The necessity of purifying water intended for human consumption has long been recognized. A contaminated water supply can be the source of many diseases and, in heavily populated areas where a large number of people consume water originating from the same source, diseases such as dysentery, cholera, and typhoid fever can reach epidemic proportions. These and other water-borne diseases have, of course, been virtually eliminated in most of the urban, densely populated areas of the world through the use of large scale, sophisticated water purification plants.

However, these remedies, which are easily adaptable to areas of affluence or well-organized social structure, have not been found to be as easily applicable to rural areas or developing countries. High cost, sparse population, lack of electrical power and the lack of skilled labor preclude installation of most efficient modern water systems. It is to this problem, namely providing safe, potable water to the people of rural developing areas, that the present invention is directed.

In approaching the problem, a research and development program was initiated to discover a water purification system which could provide maximum efficiency in purification, which could process a relatively large volume of water in a short span of time, which could function continuously, which required no electrical power since electrical power is not readily available in underdeveloped areas, and which could be operated by unskilled labor. This research and development program was extremely successful and resulted in the development of the present invention which accomplishes all the aforesaid elements.

In addition to those elements, the present invention is relatively small in size, facilitating easy installation, is low in cost and requires no special skills to maintain. But, most surprisingly, the present invention provides a degree of accuracy in the feeding of the chemical purifying agent heretofore unknown in non-electrical purifiers.

Non electrical purifiers such as the present invention are of a type commonly known as an erosion feeders. Ordinarily, the amount of chemical purificant (for example, calcium hypochlorite) dispensed by an erosion feeder fluctuates within a range which is undesirable. At the low end of the range not enough chemical is dispensed, while at the upper end of the range the level of chemical in the water is too high and the water has an undesirable "chlorine" taste. Erosion feeders currently in use, such as sloping bottom feeders, impingement and suspended mesh basket feeders, provide at best an accuracy of about two to three parts per million. Since from two to eight parts per million (ppm) of chemical are usually required to provide a residual chemical concentration of about 0.5 to 0.8 ppm, it can be seen that a fluctuation of ±2 to 3 ppm is intolerable. The present invention completely overcomes the inaccuracy of prior art erosion type purifiers by providing a chemical feed control of ±0.4 ppm.

The present invention is an improvement in an apparatus for rendering contaminated water potable, which comprises a water source, a flow controlling means for controlling the flow of the water from the water source; a chemical purification means, a first conduit connecting the flow controlling means of the chemical purification means; and an outlet from the chemical purification means to a potable water supply. Broadly, the improvement resides wherein the flow controlling means is responsive to the level of the potable water supply and which comprises (a) a valve coupled with the water source and (b) a means for opening and closing the valve which comprises (1) a variable hydrostatic pressure chamber, communicating with the valve whereby the valve is in the open position when the pressure in the chamber is less than the hydrostatic pressure of the water source, (2) a pressure relief means communicating with the variable hydrostatic pressure chamber such that when the level of the potable water supply reaches a predetermined minimum, the relief means operates to reduce the hydrostatic pressure in the chamber and (3) a second conduit from the chamber to the water source whereby water is introduced into the chamber until the hydrostatic pressure of the chamber is about equal to the hydrostatic pressure of the water source.

The accompanying figures serve to illustrate the broad aspects of the invention by depicting a preferred embodiment.

FIG. 3 is a cross sectional view of the chemical purification means.

FIGS. 4 and 5 show a preferred embodiment for the water level sensing device of the valving means.

Figure 1:
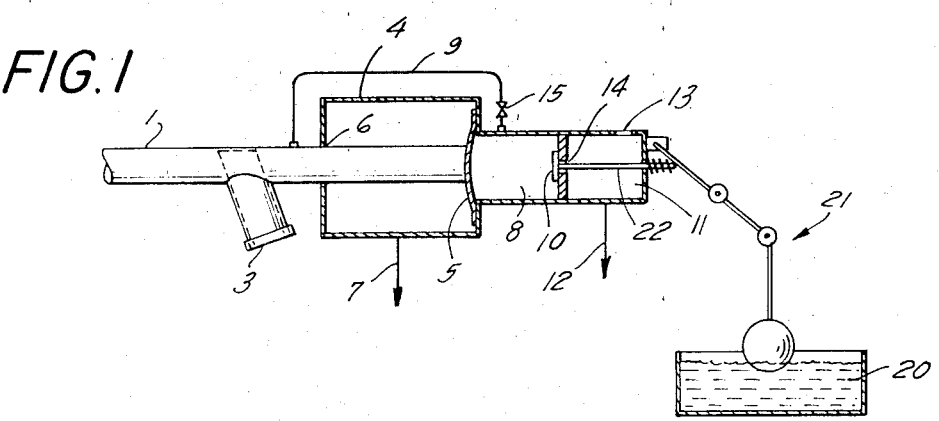
FIG. 1 is a schematic diagram of the apparatus save the chemical purification means.
Figure 2:
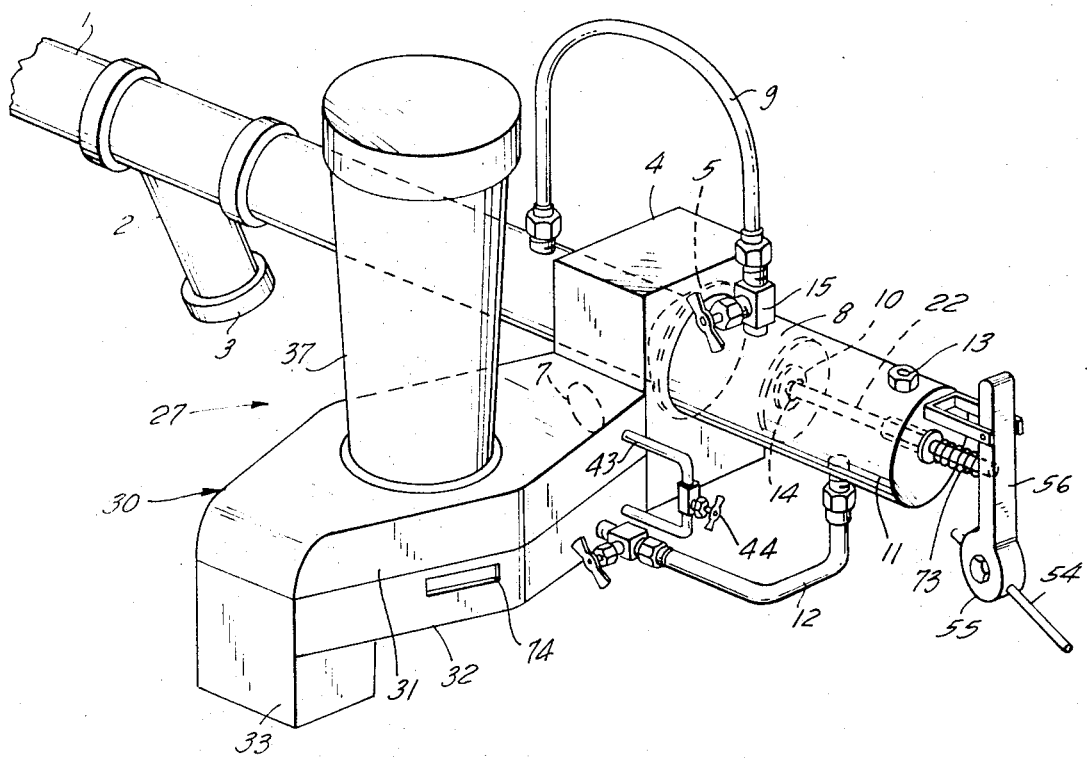
FIG. 2 is a perspective view of the apparatus partially broken away.

Referring to FIGS. 1 and 2, the water to be treated flows from its source into pipe 1 where it is initially filtered. A prime reason for initial filtration is to lower the bacterial level of the water prior to chemical treatment. It is also desirable to preclude particles of sand and sediment from entering the apparatus. Many types of in-line filters are available for this purpose and they are well within the scope of those skilled in the art, as by means of example the standard Y strainer 2. Ideally, the filter should not pass particles having an average particle size of greater than about 300 microns and there should be easy access to the filter for replacement or the removal of entrapped particles. Such easy access can be provided, for example, by a screw cap 3.

The water source pipe 1 terminates in a housing 4 where it abuts a diaphragm 5, the pipe 1 being sealed at its juncture 6 with the housing 4. The diaphragm 5 provides a valve for the pipe 1 such that when the hydrostatic pressure of the water in the pipe 1 exceeds the opposing force of the diaphragm 5, water flows into the housing 4. The housing 4 and aperture 7 in said housing 4 comprises a first conduit directing the water from the housing 4 to a chemical purification means 27 shown in FIG. 2 and FIG. 3.

The diaphragm 5 is operated by hydrostatic pressure in chamber 8. Water flows from pipe 1 through conduit 9 until the pressure in chamber 8 is equal to the pressure in the pipe 1. A valve 15 is provided on conduit 9 to control the rate of flow of water into chamber 8. When the hydrostatic pressure in chamber 8 equals the pressure in pipe 1, diaphragm 5 is in a closed position abutting pipe 1 and preventing any water in pipe 1 from entering housing 4.

When valve 10 opens, some of the water in chamber 8 escapes through a valve seat opening 14 into another chamber 11, thereby reducing the hydrostatic pressure in chamber 8 to less than the hydrostatic pressure in the water source pipe 1. Chamber 11 is vented to the air through vent 13. When the force exerted on the diaphragm 5 by the hydrostatic pressure in chamber 8 is less than the force exerted on the diaphragm 5 by the hydrostatic pressure in pipe 1, the diaphragm 5 moves away from pipe 1 into an open position and water flows from pipe 1 into housing 4 and through aperture 7 which leads to the chemical purification means 27 (see FIG. 3).

When valve 10 is closed, by a spring or other tension means 73, the hydrostatic pressure in chamber 8 rises to that of the water source pipe 1 and the diaphragm 5 is returned to its closed position, abutting the water source pipe 1, thereby shutting off the water feed to housing 4 and the chemical purification means 27. When valve 10 is closed, the apparatus is in a state of equilibrium and no water from the water source passes to the potable water supply.

In order to cause diaphragm 5 to open and close responsive to the level of the water in the potable water supply 20 a water level sensing device shown schematically in FIG. 1 as 21 is provided as the means to open and close valve 10. In general, as the water level in the water supply recedes, the weight of the level sensing device causes an inward force to be exerted on the valve stem 22, thereby causing the valve 10 to open, allowing a reduction of pressure in chamber 8 thus permitting diaphragm 5 to move to its open position. As the water level of the water supply increases, the level sensing device is urged upwards and the inward force on valve 10 is eliminated permitting the valve 10 to return to its closed position, allowing the hydrostatic pressure in chamber 8 to increase to the point where the diaphragm 5 will return to its closed position.

A more detailed explanation of a preferred embodiment of the level sensing device 21 and its relation to the valve stem 22 and valve 10 is set forth hereinafter with specific reference to FIGS. 4 and 5. It should be pointed out at this point however that by practicing this invention as described, extreme accuracy of flow control as well as very rapid opening and closing in response to the level of the water supply 20 is achieved. Valve speeds, (time elapsed from full open to full close) of less than one second are achieved.

Referring now to the apparatus at a time when valve 10 and diaphragm 5 are in an open position, the water in pipe 1 passes into housing 4 and through aperture 7 into the chemical purification means. Referring to FIG. 3, the chemical purification means consists of a housing 30 which is divided into two horizontal chambers: an upper chamber 31 and a lower chamber 32. The upper chamber 31 communicates with housing 4 through aperture 7. Water which enters the chemical purification means through aperture 7, enters the upper chamber 31. At the end of the upper chamber 31 opposite aperture 7 an outlet 33 is provided through which the water in the upper chamber passes into a conduit 34 which leads to the potable water supply. Most of the water in the upper chamber 31 passes directly through outlet 33 to the potable water supply. A portion of the water in the upper chamber 31 passes through a conduit 43 into the lower chamber 32. Conduit 43 is positioned to connect the upper chamber 31 with the lower chamber 32, and is located at the end of the upper chamber 31 nearest aperture 7. In other words, the end of the conduit 43 adjacent the upper chamber 31 is positioned such that it is below the water level of the upper chamber 31 when water is flowing into the upper chamber 31. The end of the conduit 43 adjacent the lower chamber may be positioned to suit functional engineering requirements. Valve means 44 is provided in conduit 43 such that the amount of water flowing into the lower chamber 32 may be accurately controlled. Preferably about 10 percent to 0.1 percent of the water entering the upper chamber 31 is permitted to flow into the lower chamber 32 through conduit 43.

The lower chamber 32 communicates with conduit 34 through outlet 45 which is located at that end of the lower chamber 32 opposite conduit 43, such that the water from the upper chamber 31 is mixed with that from the lower chamber 32 in conduit 34 prior to entering the potable water supply 20. In other words the water passes from conduit 43 into the lower chamber 32, through he lower chamber 32, through outlet 45 and into conduit 34 where it mixes with the water coming from the upper chamber 31. The outlets 33 and 45 are so designed that no splashback into lower chamber can occur. This requirement is necessary in order to obtain the high degree of control accuracy which this invention provides. An overflow port 74 is provided to permit excess water entering the lower chamber to escape.

A chemical source 35 communicates with the lower chamber 32 and is dissolved in the water in the lower chamber 32. An open-ended cylindrical wall 36 passes through the upper chamber 31 in a sealed relationship thereto and terminates in the lower chamber 32 at the floor 75 of the upper chamber 31. Hopper 37 is provided to contain a particulate, solid chemical source 35 and passes axially through the cylindrical wall 36, the lower end of the hopper communicating with the lower chamber. The lower end of the hopper 37 is provided with a foraminous base 38 to provide easy excess for the water in the lower chamber 32, but which precludes undissolved particles from falling into the lower chamber 32. Holes 39 may be provided in the side of the hopper to facilitate dissolution of the solid chemical. To permit the hopper 37 to be raised or lowered, thereby controlling the rate of dissolution of the solid chemical, an adapter means 40 is provided. As illustrated, the adapter means consists of male screw threads 81 on the hopper 37 and corresponding female threads 82 on the cylindrical wall 36. Hence, the distance which the hopper extends into the lower chamber 32 can be adjusted merely by rotating the hopper 37. The adapter means of course, is not limited to screw threads, but could also, for example, comprise an insert intermediate the hopper and cylindrical wall which engages both the wall and the hopper by any suitable method.

To assure that the water level in the lower chamber 32 is sufficiently high to contact the lower end of the hopper 37, a damming means is provided. Basically the damming means comprises a raised lip 41 adjacent the outlet 45, the top of which corresponds approximately to the same horizontal position as the foraminous bottom end of the hopper 37. The damming means may also be provided with a weep hole 42 to permit the water level in the lower chamber to recede from the chemical particles in the hopper when the apparatus is not in use.

As the water flows from conduit 43 into the lower chamber 32, around the chemical particles in the hopper 37 and through outlet 45 into conduit 34 to the potable water supply, certain amounts of the chemical particles are dissolved or erode into the water. The specific amount of chemical dissolved in the water can be varied by regulating the amount of water entering the lower chamber 32 by manually opening or closing valve 44 in conduit 43. In addition more or less chemical particles can be exposed to the water in the lower chamber by raising or lowering the hopper 37. The proper setting of valve 44 and the proper distance which the hopper 37 must extend into the lower chamber 32 to successfully purify a particular water source must be fixed for each water source by testing the end product at various settings. Once the proper results are achieved the settings need not subsequently by changed unless the amount of contamination in the water source changes substantially.

The normal flow of water through the lower chamber 32 assures a relatively constant rate at which the chemical particles dissolve into the water. However, it was discovered that a greater degree of accuracy in providing a constant chemical particle dissolution rate was achieved by creating a swirling movement in the water in the lower chamber 32 around the chemical particles.

In order to create this swirling movement in the lower chamber 32, the water which enters chamber 11 through valve seat 14 when valve 10 is open is gravity fed into pipe 12. Pipe 12 directs the water into the lower chamber 32 in a direction perpendicular to the flow of water in the lower chamber 32. The water from pipe 12 enter the lower chamber 32 at a point before the hopper 37. The flow of water from pipe 12 meeting with the flow of water in the lower chamber 32 creates a swirling movement in the water in the lower chamber 32. As long as valve 10 is open water flows from pipe 1, through conduit 9 into chamber 8, through valve seat 14 into chamber 11 and through pipe 12 into the lower chamber 32. This assures that the water in the lower chamber will continue to swirl around the chemical particles whenever the apparatus is in use. This constant swirling movement provides a degree of accuracy in fixing the amount of chemical dissolved in the water which has never been achieved by an erosion feeder.

FIG. 4 is a view of a preferred water level sensing device, which is shown diagrammatically as 21 in FIG. 1 and which consists of a rod and float assembly. In normal operation, float 23 is in contact with the level of the potable water supply 20. The float may comprise a hollow water-tight container of plastic, metal, or other water-impervious material, or may be solid wood, plastic or other suitable substance, provided that the float 23, in any event, has a specific gravity of less than unity, the specific gravity of water, so that the bouyant forces exerted on it by the water will force the float upwards or downwards as the water level increases or recedes. The float 23 is substantially fixed to one end of a first rod 52 which is substantially rigid. The other end of rod 52 is secured in a first pivoting clamp 53 which also accommodates one end of a second rod 54, which is also substantially rigid. The other end of rod 54 is secured in a second pivoting clamp 55. A pressure relief means operating arm 56 extends from and is affixed to the second clamp 55 and is pivotably fixed at its end to the apparatus at a point above the projection of valve stem 22. The pivot point 57 is further placed such that when the operating arm 56 is in a downwards position it will control the valve stem 22; for example, the pressure relief means, at a point 58 between its pivoting end 57 and the clamp 55.

FIG. 5 is an end view of the apparatus which clearly shows the pivoting clamps. The first pivoting clamp comprises four laminar discs 62 which are held together in pressure contact by a combination of waters 63, a bolt 64, and a nut 65. Rods 52 and 54 are substantially fixed in a pressure tight relationship with the clamp. This is accomplished by boring a channel through a chord of the laminar discs 62 along interface 66. The channel should be of slightly less diameter than the rods 52 and 54 so that when nut 65 is urged inwardly, thus compressing the discs together, the rods 52 and 54 are securely held in their respective channels along interface 66 thereby substantially fixing the rods in place. As can be seen from the drawings, the angle formed by rods 52 and 54 having its vertex at clamp 53 can be adjusted as desired, to conform to the level of the potable water supply. When the desired angle has been determined, the rods can be fixed spatially with respect to each other simply by tightening the nut 65.

Likewise, clamp 55 is adjustable. It comprises two laminar discs 68, the pressure relief means operating arm 56, washers 69, bolt 70 and nut 71. Rod 54 is substantially fixed to clamp 55 in the same way as it is fixed to clamp 53 by means of a bored channel through a chord along interface 72. The discs are held in a pressure relationship against operating arm 56 by means of bolt 70 and nut 71. As is readily seen in the drawing, the angle between the operating arm and rod 54 is adjustable by loosening nut 71, positioning the arm and rod as desired and retightening the nut 71.

While the drawings depict only a preferred embodiment of the present invention, it should be obvious to one of reasonable skill in the art that there are many ramifications of the present invention which reside well within the intended scope thereof. Accordingly, the valve in the flow controlling means can be a diaphragm or pressure sensitive gate valve or any type of valve mechanism provided only that it be responsive to the hydrostatic pressure differential between the water source and the variable hydrostatic pressure chamber (i.e. 8.)

Furthermore, the chemical purification means can include a multitude of ramifications. For example, the chemical source communicating with the lower chamber can comprise a nozzle for the gravity or pressure feeding of liquid chemicals such as bromine or gaseous material such as chlorine. Preferably, to simplify the operation of the apparatus, a hopper construction such as that described supra and illustrated in FIG. 2 and FIG. 3 is employed. This construction facilitates the use of a broad spectrum of chemical sanitizing agents, among which are iodine, chlorinated lime, sodium hypochlorite, lithium hypochlorite, calcium hypochlorite, and chlorinated isocyanurates. Because of its low cost and high degree of sanitizing activity, calcium hypochlorite has been found to be preferable over most of the other solid chemicals available.

The apparatus can be constructed of any material which is compatible with the chemical being used for purification, but it has been found that the present invention is particularly adaptable to plastics. Since the pressures involved are well within the tensile capacity of plastics such as polyethylene, polypropylene and ABS and because these materials are light-weight, inexpensive to purchase and mold, highly resistent to chemicals and weather attrition, they have been found ideally adaptable to this invention. For example, an apparatus in accordance with the present invention was fabricated from ABS terpolymer. This material was used for the housing (including the water source pipe 1 and chambers 8 and 11) the filter 2 and the screw cap 3, and the chemical purification means such as is illustrated in FIG. 3.

The diaphragm in the flow controlling means is constructed of any flexible material suitable for use with water. Typical of such materials are neoprene rubber, leather, ABS terpolymer, and a nylon/rubber laminate.

The following example serves to point out the high degree of chemical control and relative ease of the present invention. It is, however, in no way intended as limiting the scope of the invention.

EXAMPLE

One end of the capped 1½ inch flexible plastic pipe was buried 2½ inches below the sand at the bottom of a biologically contaminated small river. The buried portion of this pipe had a series of ⅛ inch holes interspersed along its lateral walls. The other end of the pipe ran over the bank of the river and down the other side of the bank to a point 8 feet below the mean low water mark of the river. The apparatus was then attached to the lower end of the pipe.

Prior testing had indicated that 4½ ppm of chlorine were required by the water to effectively decontaminate it and leave a residual of 0.7 ppm free available chlorine. The apparatus was therefore adjusted so that 1 percent of the total flow of the water through the apparatus entered the lower chamber of the chemical purification means so that it penetrated the lower body of water to three-eighths of an inch. The hopper was charged with Olin's calcium hypochlorite tablets. These tablets were found to have the following physical and chemical characteristics:

| Physical Form | | |
| --- | --- | --- |
| Diameter | ¾" | |
| Thickness at center | 7/16" | |
| Weight | 5.0 gms. | |
| Density GMS/cc | | |
| Minimum | 0.73 | |
| Maximum | 0.83 | |
| Basic Chemical Analysis | | |
| Calcium hypochlorite | $Ca(OCl)_2$ | 71.89% |
| Minor Components | | |
| Calcium Chloride | $CaCl_2$ | 0.22 |
| Calcium Chlorate | $CaClO_3$ | 0.83 |
| Calcium Hydroxide | $Ca(OH)_2$ | 0.87 |
| Calcium Carbonate | $CaCO_3$ | 2.62 |
| Sodium Chloride | $NaCl$ | 19.78 |
| Water | $H_2O$ | 0.50 |
| Iron | $Fe$ | 0.018 |
| Magnesium Oxide | $M_oO$ | 0.11 |
| Stability | | |
| % Loss of Chlorine | | 7.4 |

A siphon was then caused in the pipe, so that the water came through the holes in the pipe, was siphoned over the bank, fell in excess of 8 feet, passed through the apparatus and then free fell 5 feet into a cleaned and empty 2,000 gallon potable water tank which serves a village of 500 inhabitants. The tank was then allowed to fill with water effluent from the apparatus and the rod and float assembly was adjusted. The village was then allowed to draw upon the water at normal rates. During peak hours, the demand was at a rate of 1,000 gallons per hour. At other times there was no water demand. An average demand was 400 gallons per hour. The system was monitored for 2 weeks. Each hour the residual chlorine, and the percentage of water in the tank was noted and (there was no substantial variation in the chlorine requirements of the raw river water). A typical days run yielded the following information:

| Hour | % in tank | Chlorine Residual | Hour | % in tank | Chlorine Residual |
| --- | --- | --- | --- | --- | --- |
| 1 | 100 | 0.65 | 13 | 100 | 0.75 |
| 2 | 100 | 0.60 | 14 | 95 | 0.80 |
| 3 | 100 | 0.55 | 15 | 70 | 0.65 |
| 4 | 100 | 0.50 | 16 | 90 | 0.65 |
| 5 | 98 | 0.80 | 17 | 93 | 0.75 |
| 6 | 87 | 0.80 | 18 | 94 | 0.70 |
| 7 | 87 | 0.85 | 19 | 94 | 0.50 |
| 8 | 93 | 0.90 | 20 | 95 | 0.45 |
| 9 | 95 | 0.70 | 21 | 98 | 0.40 |
| 10 | 95 | 0.70 | 22 | 98 | 0.60 |
| 11 | 95 | 0.65 | 23 | 97 | 0.75 |
| 12 | 95 | 0.70 | 24 | 100 | 0.80 |

During the period of the two weeks a free residual chlorine supply of 0.7 ± 0.35 parts was always present in the potable water. The tank was always within 20 percent of the total capacity.

What is claimed is:

1. In an apparatus for rendering contaminated water potable which comprises a water source, a flow controlling means for controlling the flow of water from the water source, a chemical purification means, a first conduit connecting the flow controlling means to the purification means, and an outlet from the purification means to a potable water supply; the improvements which comprise providing the water source with a filtration means capable of removing particles larger than about 300 microns from the water entering the flow controlling means, and wherein the flow controlling means is responsive to the level of the potable water supply and which comprises (a) a valve coupled with the water source and (b) an activating means for opening and closing the valve which comprises (i) a variable hydrostatic pressure chamber communicating with the valve whereby the valve is in the open position when the pressure in the chamber is less than the hydrostatic pressure of the water source, (ii) a pressure relief means communicating with the variable hydrostatic pressure chamber and a water overflow chamber such that when the level of the potable water supply reaches a predetermine minimum, the relief means operates to reduce the hydrostatic pressure in the pressure chamber by permitting water to flow from the pressure chamber into the overflow chamber, (iii) a second conduit from the water source to the pressure chamber and which bypasses the valve whereby water is introduced into the pressure chamber until the hydrostatic pressure of the pressure chamber is about equal to the hydrostatic pressure of the water source, and (iv) a third conduit communicating between the overflow chamber and the chemical purification means whereby water entering the overflow chamber is conveyed to the chemical purification means.

2. The improvement of claim 1 in which the chemical purification means comprises (a) housing having an upper horizontal chamber and a lower horizontal chamber, the upper chamber communicating with the first conduit and with the outlet to the potable water supply, and the lower chamber communicating with the (i) upper chamber by means of a fourth conduit from the lower chamber to the upper chamber such that a portion of the water entering the upper chamber flows through the fourth conduit into the lower chamber, the fourth conduit being provided with a valve means to regulate the quantity of water which flows therethrough and (ii) with the outlet to the potable water supply; and (b) a chemical source communicating with the lower chamber for introducing chemicals into the water in the lower chamber.

3. The improvement of claim 2 in which the pressure relief means is operated by an adjustable rod and float assembly which comprises (i) a float having a specific gravity of less than unity, (ii) a first rod having one end substantially fixed to the float and the other end substantially fixed to a first pivoting clamp, (iii) a second rod having one end substantially fixed to the first pivoting clamp such that the angle formed by the first rod and second rod and having its vertex at the first clamp can be adjusted to conform to the water level of the potable water supply, and the other end of the second rod substantially fixed to a second pivoting clamp; and (iv) a pressure relief means operating arm projecting from the second clamp and pivotably fixed at its end to the apparatus, and the operating arm contacting the pressure relief means at a point on the arm between its pivoting fixed end and the second clamp.

4. The improvement in claim 2 in which the chemical source comprises a solid, water-soluble, water purifying chemical in the form of compressed pellets.

5. The improvement in claim 2 in which the chemical source comprises:
   a. an open-ended cylindrical wall passing vertically from the outside of the housing through the upper chamber in a sealed relationship therewith into the lower chamber;
   b. a hopper for holding a particulate solid to be dissolved by the water in the lower chamber, the hopper passing axially through the cylindrical wall and communicating with the lower chamber, and having a closed upper end and a foraminous lower end;
   c. an adapter means for holding the hopper in an adjustable relationship with the cylindrical wall such that the position of the lower foraminous end of the hopper can be adjusted, relative to the lower chamber whereby the rate of dissolution of the particulate solid can be accurately controlled; and
   d. a damming means in the lower chamber adjacent the outlet to maintain a level of water in the lower chamber within the proximity of the lower end of the hopper.

6. The improvement in claim 1 in which the valve is a flexible diaphragm one side of which communicates with the water source the other side of which communicates with the variable hydrostatic pressure chamber such that when the hydrostatic pressure of the water source and the hydrostatic pressure in the chamber are substantially equal said diaphragm is in a closed position abutting the water source thereby precluding the flow of water from the water source and when the hydrostatic pressure of the water source is greater than the hydrostatic pressure in the chamber said diaphragm moves into an open position away from the water source, thereby allowing the flow of water from the water source.

7. The improvement of claim 5 in which the lower chamber is provided with a weep hole which communicates between the lower chamber and the outlet, thereby permitting the water level in the lower chamber to subside when the apparatus is not in use.

8. The improvement of claim 2 in which the fourth conduit communicates with (a) the upper chamber at a position below the normal water level of the upper chamber when water is flowing through the apparatus, and (b) with the lower chamber at a position below the water level of the lower chamber and substantially perpendicular to the flow of water through the lower chamber thereby creating a swirling movement in the water in the lower chamber to assure a constant chemical dissolution rate.

9. The improvement of claim 2 in which the third conduit communicates with the overflow chamber and the lower horizontal chamber, thereby permitting water to flow from chamber, the third conduit being positioned below the water level of the lower chamber and substantially perpendicular to the flow of water through the lower chamber, thereby creating a swirling movement in the water to assure a constant chemical dissolution rate.

* * * * *

UNITED STATES PATENT OFFICE
CERTIFICATE OF CORRECTION

Patent No. 3,727,760      Dated April 17, 1973

Inventor(s) Charles A. Soriano et al.

It is certified that error appears in the above-identified patent and that said Letters Patent are hereby corrected as shown below:

Title of invention "WATER DECOMPOSITION APPARATUS" should read -- WATER DECONTAMINATION APPARATUS --.

Signed and sealed this 12th day of February 1974.

(SEAL)
Attest:

EDWARD M. FLETCHER, JR.
Attesting Officer

C. MARSHALL DANN
Commissioner of Patents